United States Patent
Xu

(10) Patent No.: US 9,874,904 B2
(45) Date of Patent: Jan. 23, 2018

(54) FLEXIBLE DISPLAY APPARATUS

(71) Applicant: BOE TECHNOLOGY GROUP CO., LTD., Beijing (CN)

(72) Inventor: Zhiqiang Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/325,875

(22) PCT Filed: Jun. 7, 2016

(86) PCT No.: PCT/CN2016/085097
§ 371 (c)(1),
(2) Date: Jan. 12, 2017

(87) PCT Pub. No.: WO2016/202190
PCT Pub. Date: Dec. 22, 2016

(65) Prior Publication Data
US 2017/0160769 A1     Jun. 8, 2017

(30) Foreign Application Priority Data

Jun. 16, 2015   (CN) .......................... 2015 1 0335119

(51) Int. Cl.
*H05K 5/02*     (2006.01)
*G06F 1/16*     (2006.01)

(52) U.S. Cl.
CPC .......... *G06F 1/1641* (2013.01); *G06F 1/1616* (2013.01)

(58) Field of Classification Search
CPC .... G06F 1/1652; G06F 1/1616; G06F 1/1641; G06F 1/1681; H04M 1/0268; G09F 9/301
(Continued)

(56) References Cited

U.S. PATENT DOCUMENTS 6,377,324 B1 * 4/2002 Katsura ............. G02F 1/133305
349/58
6,577,496 B1 * 6/2003 Gioscia ................. G06F 1/1616
345/156
(Continued)

FOREIGN PATENT DOCUMENTS

CN       103294113 A     9/2013
CN       103514809 A     1/2014
(Continued)

OTHER PUBLICATIONS

International Search Report & Written Opinion dated Aug. 26, 2016 regarding PCT/CN2016/085097.
(Continued)

*Primary Examiner* — Shin H Kim
(74) *Attorney, Agent, or Firm* — Intellectual Valley Law, P.C.

(57) ABSTRACT

The present application discloses a display apparatus including a foldable display panel comprising a bendable portion, a first nonbendable flat portion and a second nonbendable flat portion on two opposite sides of the bendable portion; a first housing portion and a second housing portion coupled together by a hinge and rotatable with respect to each other between a first configuration corresponding to the foldable display panel in an unfolded configuration and a second configuration corresponding to the foldable display panel in a folded configuration; and a first movable support received in the first housing portion for supporting the first nonbendable flat portion and configured to be movable between a first position corresponding to the unfolded configuration and a second position corresponding to the folded configuration. The first movable support at the first position supporting a part of the bendable portion of the foldable display panel; and the first movable support at the second position (Continued)

providing a space for receiving the bendable portion bent therein.

20 Claims, 11 Drawing Sheets

(58) Field of Classification Search
   USPC .................................................. 361/679.01
   See application file for complete search history.

(56) References Cited

U.S. PATENT DOCUMENTS

| | | | |
|---|---|---|---|
| 9,119,316 B2* | 8/2015 | Lee ........................... | H05K 7/16 |
| 9,348,369 B2* | 5/2016 | Kee ........................ | G06F 1/1616 |
| 2012/0002360 A1* | 1/2012 | Seo ....................... | G06F 1/1616 |
| | | | 361/679.01 |
| 2012/0033354 A1* | 2/2012 | Huang ..................... | G09F 9/33 |
| | | | 361/679.01 |
| 2013/0010405 A1* | 1/2013 | Rothkopf ............ | H04M 1/0216 |
| | | | 361/679.01 |
| 2013/0120912 A1* | 5/2013 | Ladouceur .......... | H04M 1/0268 |
| | | | 361/679.01 |
| 2013/0314611 A1* | 11/2013 | Okutsu .................... | H04N 5/64 |
| | | | 348/739 |
| 2014/0029171 A1* | 1/2014 | Lee ......................... | H05K 7/16 |
| | | | 361/679.01 |
| 2014/0355195 A1 | 12/2014 | Kee et al. | |
| 2016/0143162 A1* | 5/2016 | Van Dijk .............. | G06F 1/1652 |
| | | | 361/679.01 |

FOREIGN PATENT DOCUMENTS

| | | |
|---|---|---|
| CN | 103582340 A | 2/2014 |
| CN | 103914273 A | 7/2014 |
| CN | 104506688 A | 4/2015 |

OTHER PUBLICATIONS

First Office Action in the Chinese Patent Application No. 201510335119.9, dated Aug. 24, 2017; English translation attached.

* cited by examiner

Second position

FLEXIBLE DISPLAY APPARATUS

CROSS-REFERENCE TO RELATED APPLICATION

This application is a national stage application under 35 U.S.C. § 371 of International Application No. PCT/CN2016/085097, filed Jun. 7, 2016, which claims priority to Chinese Patent Application No. 201510335119.9, filed Jun. 16, 2015, the contents of which are incorporated by reference in the entirety.

TECHNICAL FIELD

The present invention relates to display technology, more particularly, to a flexible display apparatus.

BACKGROUND

Flexible display apparatuses may be made foldable. FIG. 1 is a diagram illustrating the structure of a conventional foldable display apparatus. Referring to FIG. 1, the display apparatus includes a first housing portion 101, a second housing portion 102, a foldable display panel 103, and a rotating shaft 104. The foldable display panel 103 includes a first portion, a second portion, and a third portion. The first portion is on the first housing portion 101, the second portion is on the second housing portion 102, and the third portion connects the first portion and the second portion. The first portion and the second portion can rotate with respect to each other around the rotating shaft 104 between a closed state and an open state. In the closed state, the first portion and the second portion face each other, the curved third portion is received between the first portion and the second portion. In the open state, the first portion, the second portion and the third portion form a substantially planar display surface. The first housing portion 101 includes a first recess around the rotating shaft, the second housing portion 102 includes a second recess around the rotating shaft. The first recess and the second recess are next to each other and together form a cavity underneath the third portion in the open state. Thus, the third portion of the foldable display panel is not supported in the open state, making it susceptible to damage.

SUMMARY

In one aspect, the present disclosure provides a display apparatus comprising a foldable display panel comprising a bendable portion, a first nonbendable flat portion and a second nonbendable flat portion on two opposite sides of the bendable portion; a first housing portion and a second housing portion coupled together by a hinge and rotatable with respect to each other between a first configuration corresponding to the foldable display panel in an unfolded configuration and a second configuration corresponding to the foldable display panel in a folded configuration; and a first movable support received in the first housing portion for supporting the first nonbendable flat portion and configured to be movable between a first position corresponding to the unfolded configuration and a second position corresponding to the folded configuration. The first movable support at the first position supporting a part of the bendable portion of the foldable display panel; and the first movable support at the second position providing a space for receiving the bendable portion bent therein.

Optionally, the first movable support at the first position substantially abuts a first inner side surface of the first housing portion so that substantially an entire surface of the bendable portion is supported by at least the first housing portion and the second housing portion; the first movable support at the second position is spaced apart from the first inner side surface for receiving the bendable portion in a space between the first movable support and the first inner side surface.

Optionally, the first housing portion and the second housing portion are coupled together at a first housing wall of the first housing portion and a second housing wall of the second housing portion; the first housing wall has a first top surface connected to the first inner side surface; and in the unfolded configuration substantially the entire surface of the bendable portion is supported by at least the first top surface and the second housing portion.

Optionally, the bendable portion has a length L along a direction from the first nonbendable flat portion to the second nonbendable flat portion in the unfolded configuration, the first top surface has a first width W1 along a direction from the first inner surface to the hinge, and L is substantially twice that of W1.

Optionally, the bendable portion has a length L along a direction from the first nonbendable flat portion to the second nonbendable flat portion in the unfolded configuration, L is substantially twice that of a first normal distance D1 between the hinge and a first interface between the first top surface and the first inner side surface.

Optionally, the first nonbendable flat portion is mounted on the first movable support, and is movable together with the first movable support with respect to the first housing portion.

Optionally, the second nonbendable flat portion is mounted on the second housing portion.

Optionally, the display apparatus further comprises a first tensioning structure connecting the first housing portion with the first movable support, the first tensioning structure configured to maintain the first movable support spaced apart from the first inner side surface in the folded configuration.

Optionally, the first tensioning structure is in a stretched state when the foldable display panel is in the unfolded configuration, and in a relaxed state when the foldable display panel is in the folded configuration.

Optionally, the display apparatus further comprises a second movable support received in the second housing portion for supporting the second nonbendable flat portion and configured to be movable between a third position corresponding to the unfolded configuration and a fourth position corresponding to the folded configuration; when the foldable display panel is in the unfolded configuration the second movable support at the third position substantially abuts a second inner side surface of the second housing portion so that substantially the entire surface of the bendable portion is supported by at least the first housing portion and the second housing portion; in the folded configuration the first movable support at the second position is spaced apart from the first inner side surface and the second movable support at the fourth position is spaced apart from the second inner side surface for receiving the bendable portion in a space between the second movable support and the second inner side surface.

Optionally, the first housing portion and the second housing portion are coupled together at a first housing wall of the first housing portion and a second housing wall of the second housing portion; the first housing wall has a first top surface connected to the first inner side surface; the second housing wall has a second top surface connected to the second inner side surface; and in the unfolded configuration substantially the entire surface of the bendable portion is supported by at least the first top surface and the second top surface.

Optionally, the bendable portion has a length L along a direction from the first nonbendable flat portion to the second nonbendable flat portion in the unfolded configuration, the first top surface has a first width W1 along a direction from the first inner surface to the hinge, the second top surface has a second width W2 along a direction from the second inner surface to the hinge, and L is substantially the same as a sum of W1 and W2.

Optionally, the bendable portion has a length L along a direction from the first nonbendable flat portion to the second nonbendable flat portion in the unfolded configuration, L is substantially the same as a sum of a first normal distance D1 between the hinge and a first interface between the first top surface and the first inner side surface, and a second normal distance D2 between the hinge and a second interface between the second top surface and the second inner side surface.

Optionally, the first nonbendable flat portion is mounted on the first movable support, and is movable together with the first movable support with respect to the first housing portion; the second nonbendable flat portion is mounted on the second movable support, and is movable together with the second movable support with respect to the second housing portion.

Optionally, the display apparatus further comprises a first tensioning structure connecting the first housing portion with the first movable support, the first tensioning structure configured to maintain the first movable support spaced apart from the first inner side surface in the folded configuration; and a second tensioning structure connecting the second housing portion with the second movable support, the second tensioning structure configured to maintain the second movable support spaced apart from the second inner side surface in the folded configuration.

Optionally, the first tensioning structure and the second tensioning structure are in a stretched state when the foldable display panel is in the unfolded configuration, and in a relaxed state when the foldable display panel is in the folded configuration.

Optionally, the first housing portion has a thickness substantially the same as that of the second housing portion.

Optionally, the first movable support has a thickness substantially the same as that of the second movable support.

Optionally, the first tensioning structure is a spring.

Optionally, the first tensioning structure and the second tensioning structure are springs.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
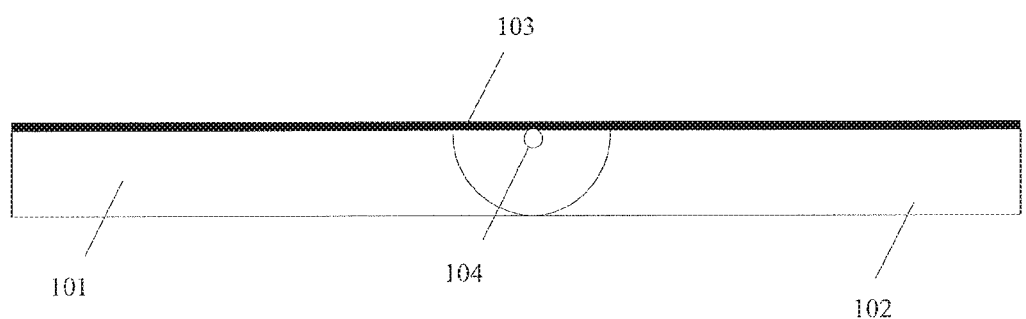
FIG. 1 is a diagram illustrating the structure of a conventional display apparatus.

The disclosure will now describe more specifically with reference to the following embodiments. It is to be noted that the following descriptions of some embodiments are presented herein for purpose of illustration and description only. It is not intended to be exhaustive or to be limited to the precise form disclosed.

The present disclosure provides a novel display apparatus that obviates one or more of the problems due to limitations and disadvantages of the convention display apparatus. In some embodiments, the display apparatus includes a foldable display panel that can be folded in a folded configuration and unfolded in an unfolded configuration. The foldable display panel includes a bendable portion, a first nonbendable flat portion and a second nonbendable flat portion on two opposite sides of the bendable portion. In the folded configuration, the first nonbendable flat portion and the second nonbendable flat portion face each other. In the unfolded configuration, the bendable portion, and the second nonbendable flat portion are substantially coplanar. Optionally, the first nonbendable flat portion, the second nonbendable flat portion, and the bendable portion are a continuous foldable display panel. Optionally, the first nonbendable flat portion, the second nonbendable flat portion, and the bendable portion are an integral foldable display panel.

The display apparatus further includes a housing for enclosing the foldable display panel in the folded configuration and supporting the foldable display panel in the unfolded configuration. The housing includes a first housing portion corresponding to the first nonbendable flat portion and a second housing portion corresponding to the second nonbendable flat portion. The first housing portion and the second housing portion provides a frame and support for the foldable display panel.

The display apparatus further includes at least one movable support received in the housing, e.g., a first movable support received in the first housing portion. The movable support is configured to support the first nonbendable flat portion or the second nonbendable flat portion. In some embodiments, the display apparatus includes only a first movable support for supporting the first nonbendable flat portion. In some embodiments, the display apparatus includes a first movable support for supporting the first nonbendable flat portion and a second movable support for supporting the second nonbendable flat portion.

The first movable support is received in the first housing portion. For example, the first housing portion has a first recess for receiving the first movable support. Similarly, when the display apparatus includes a second movable support, the second movable support is received in the first housing portion. For example, the second housing portion has a second recess for receiving the second movable support. In some embodiments, the display apparatus includes a first housing portion having a first recess for receiving the first movable support, and a second housing portion having a second recess for receiving the second movable support.

In some embodiments, the first housing portion includes a first housing wall, and the second housing portion includes a second housing wall. The first housing wall is on a side of the first housing portion proximal to the second housing portion, and the second housing wall is on a side of the second housing portion proximal to the first housing portion. Optionally, the first housing wall and the second housing wall are adjacent to each other when the foldable display panel is in the open position for display. When the first housing portion includes a first recess, the first housing wall defines one side of the first recess. When the second housing portion includes a second recess, the second housing wall defines one side of the second recess.

In some embodiments, the first housing portion and the second housing portion are coupled together (e.g., by a hinge) with respect to each other, and are rotatable with respect to each other between a first configuration corresponding to the foldable display panel in an unfolded configuration and a second configuration corresponding to the foldable display panel in a folded configuration.

In some embodiments, the first housing portion and the second housing portion are hinged together at the first housing wall and the second housing wall by, e.g., a hinge. Any appropriate hinge may be used for permitting the first housing portion and the second housing portion (e.g., the first housing wall and the second housing wall) to be fixed together and yet be able to move or swing relative to each other. Examples of hinges include, but are not limited to, mechanical hinges, plastic hinges, metal hinges, etc. Optionally, the hinge is so dimensioned that, when it couples the first housing wall and the second housing wall together, the first housing wall and the second housing wall are adjacent to each other when the foldable display panel is in the unfolded configuration for display. For example, the hinge is of a small size such that it does not create a gap between the first housing wall and the second housing wall when the foldable display panel is in the unfolded configuration. When the foldable display panel is in the unfolded configuration (see, e.g., FIGS. 2A-2C, 3, 4, 7, 8, 11, and 12), the hinge is on a side of the housing proximal to the foldable display panel, e.g., proximal to the bendable portion. When the foldable display panel is in the folded configuration (see, e.g., FIGS. 5, 6, 9, 10, 13, and 14), the hinge is on a side of the first housing wall and the second housing wall distal to the bendable portion.

In some embodiments, the first movable support is movable (e.g., by a sliding device or mechanism) with respect to the first housing portion between a first position corresponding to the unfolded configuration and a second position corresponding to the folded configuration, the second position being on a side of the first position distal to the hinge. The first movable support at the first position supports a part of the bendable portion of the foldable display panel, and the first movable support at the second position provides a space for receiving the bendable portion bent therein. The first movable support at the first position substantially abuts a first inner side surface of the first housing portion when the foldable display panel is in the unfolded configuration. In the unfolded configuration, substantially an entire surface of the bendable portion is supported by at least the first housing portion and the second housing portion. Optionally, substantially the entire surface of the bendable portion is supported by the first housing portion and the second housing portion, and the movable support (e.g., the first movable support or the second movable support) when the foldable display panel is in the unfolded configuration. The first movable support at the second position is spaced apart from the first inner side surface of the first housing portion for receiving the bendable portion when the foldable display panel is in the folded configuration.

In some embodiments, the first housing wall has a first top surface connected to the first inner side surface. When the foldable display panel is in the unfolded configuration, substantially the entire surface of the bendable portion is supported by at least the first top surface and the second housing portion. When the foldable display panel is in the unfolded configuration (see, e.g., FIGS. 2A-2C, 3, 4, 7, 8, 11, and 12), the first top surface is proximal to the foldable display panel (e.g., the bendable portion), and supports at least a part of the bendable portion. When the foldable display panel is in the folded configuration (see, e.g., FIGS. 5, 6, 9, 10, 13, and 14), the first top surface faces the second housing portion (e.g., a second top surface of the second housing wall if the second housing portion includes a second recess).

The first housing portion also includes a first outer side surface opposite to the first inner side surface. When the foldable display panel is in the unfolded configuration, the first outer side surface is adjacent to the second housing portion (e.g., adjacent to a corresponding second outer side surface of the second housing portion). Optionally, the hinge is disposed between the first outer side surface and the second outer side surface.

The first movable support has a proximal side and a distal side. The proximal side is proximal to the first inner side surface of the first housing wall, and the distal side is distal to the first inner side surface of the first housing portion. When the foldable display panel is in the unfolded configuration, the proximal side of the first movable support is substantially adjacent to the first inner side surface so that substantially the entire surface of foldable display panel is supported by at least the first movable support, the first top surface, and the second housing portion. When the foldable display panel is in the folded configuration, the proximal side of the first movable support is spaced apart from the first inner side surface by a first distance thereby forming the cavity for receiving the bendable portion in the closed position.

In some embodiments, the bendable portion has a length L along a direction from the first nonbendable flat portion to the second nonbendable flat portion in the unfolded configuration, the first top surface has a first width W1 along a direction from the first inner surface to the hinge, and L is substantially twice that of W1.

In some embodiments, the bendable portion has a length L along a direction from the first nonbendable flat portion to the second nonbendable flat portion in the unfolded configuration, L is substantially twice that of a first normal distance D1 between the hinge and a first interface between the first top surface and the first inner side surface.

In some embodiments, the first nonbendable flat portion is mounted on the first movable support, and is movable together with the first movable support with respect to the first housing portion. For example, the first nonbendable flat portion may be fixed (e.g., glued, screwed) on the first movable support. When the first movable support moves relative to the first housing portion, the first nonbendable flat portion moves in sync with the first movable support relative to the first housing portion. In some embodiments, the second nonbendable flat portion is mounted on the second housing portion. For example, the second nonbendable flat portion may be fixed (e.g., glued, screwed) on the second housing portion.

In some embodiments, the display apparatus also includes a first tensioning structure connecting the first housing portion with the first movable support. The first tensioning structure is configured to maintain the first movable support spaced apart from the first inner side surface when the foldable display panel is in the folded configuration. The first housing portion and the first movable support may be connected by the first tensioning structure at any appropriate positions. For example, a side of the first housing portion may be connected to the first tensioning structure, and in turn connected to the first movable support through the first tensioning structure. Any appropriate tensioning structure may be used for maintaining the first movable support spaced apart from the first inner side surface when the foldable display panel is in the folded configuration. Examples of the tensioning structure include, but are not limited to, one or more springs.

Optionally, the first tensioning structure is in a stretched state when the foldable display panel is in the unfolded configuration, and in a relaxed state when the foldable display panel is in the folded configuration. Optionally, the first tensioning structure is in a stretched state when the foldable display panel is in the unfolded configuration, and in a compressed state when the foldable display panel is in the folded configuration.

In some embodiments, the display apparatus further includes a second movable support for supporting the second nonbendable flat portion, i.e., the display apparatus includes a first housing portion having a first recess for receiving the first movable support, and a second housing portion having a second recess for receiving the second movable support. For example, the second housing portion may have a second recess for receiving the second movable support. Accordingly, in some embodiments, the display apparatus includes a first housing portion having a first recess for receiving the first movable support, and a second housing portion having a second recess for receiving the second movable support.

In some embodiments, the first housing portion includes a first housing wall, and the second housing portion includes a second housing wall. The first housing wall is on a side of the first housing portion proximal to the second housing portion, and the second housing wall is on a side of the second housing portion proximal to the first housing portion. Optionally, the first housing wall and the second housing wall are adjacent to each other when the foldable display panel is in the open position for display. Optionally, the first housing wall defines one side of the first recess, and the second housing wall defines one side of the second recess.

In some embodiments, the second movable support is movable (e.g., by a sliding device or mechanism) with respect to the second housing portion between a third position corresponding to the unfolded configuration and a fourth position corresponding to the folded configuration, the fourth position being on a side of the third position distal to the hinge. The second movable support at the third position substantially abuts a second inner side surface of the second housing portion when the foldable display panel is in the unfolded configuration. In the unfolded configuration, substantially an entire surface of the bendable portion is supported by at least the first housing portion and the second housing portion. Optionally, substantially the entire surface of the bendable portion is supported by the first housing portion and the second housing portion, and the movable support (e.g., the first movable support or the second movable support) when the foldable display panel is in the unfolded configuration. The second movable support at the fourth position is spaced apart from the second inner side surface of the second housing portion for receiving the bendable portion when the foldable display panel is in the folded configuration.

In some embodiments, the second housing wall has a second top surface connected to the second inner side surface. When the foldable display panel is in the unfolded configuration, substantially the entire surface of the bendable portion is supported by at least the first top surface and the second top surface. When the foldable display panel is in the unfolded configuration (see, e.g., FIGS. 2A, 3, and 4), the first top surface and the second top surface are proximal to the foldable display panel (e.g., the bendable portion), and supports at least a part of the bendable portion. When the foldable display panel is in the folded configuration (see, e.g., FIGS. 5 and 6), the first top surface and the second top surface face each other.

The second housing portion also includes a second outer side surface opposite to the second inner side surface. When the foldable display panel is in the unfolded configuration, the second outer side surface is adjacent to a corresponding first outer side surface of the first housing portion. Optionally, the hinge is disposed between the first outer side surface and the second outer side surface.

The second movable support has a proximal side and a distal side. The proximal side is proximal to the second inner side surface of the second housing portion, and the distal side is distal to the second inner side surface of the second housing portion. When the foldable display panel is in the unfolded configuration, the proximal side of the second movable support is substantially adjacent to the second inner side surface so that substantially the entire surface of foldable display panel is supported by at least the first movable support, the first top surface, the second movable support, and the second top surface. When the foldable display panel is in the folded configuration, the proximal side of the second movable support is spaced apart from the second inner side surface by a second distance thereby forming the cavity for receiving the bendable portion in the closed position.

In some embodiments, the bendable portion has a length L along a direction from the first nonbendable flat portion to the second nonbendable flat portion in the unfolded configuration, the first top surface has a first width W1 along a direction from the first inner surface to the hinge, the second top surface has a second width W2 along a direction from the second inner surface to the hinge, and L is substantially the same as (W1+W2).

In some embodiments, the bendable portion has a length L along a direction from the first nonbendable flat portion to the second nonbendable flat portion in the unfolded configuration, L is substantially the same as a sum of a first normal distance D1 between the hinge and a first interface between the first top surface and the first inner side surface, and a second normal distance D2 between the hinge and a second interface between the second top surface and the second inner side surface.

In some embodiments, the second nonbendable flat portion is mounted on the second movable support, and is movable together with the second movable support with respect to the second housing portion. Optionally, the first nonbendable flat portion is mounted on the first movable support, and is movable together with the first movable support with respect to the first housing portion; and the second nonbendable flat portion is mounted on the second movable support, and is movable together with the second movable support with respect to the second housing portion. For example, the first nonbendable flat portion may be fixed (e.g., glued, screwed) on the first movable support, and the second nonbendable flat portion may be fixed (e.g., glued, screwed) on the second movable support. When the first movable support moves relative to the first housing portion, the first nonbendable flat portion moves in sync with the first movable support relative to the first housing portion. When the second movable support moves relative to the second housing portion, the second nonbendable flat portion moves in sync with the second movable support relative to the second housing portion.

In some embodiments, the display apparatus also includes a second tensioning structure connecting the second housing portion with the second movable support. The second tensioning structure is configured to maintain the second movable support spaced apart from the second inner side surface when the foldable display panel is in the folded configuration. The second housing portion and the second movable support may be connected by the second tensioning structure at any appropriate positions. For example, a side of the second housing portion may be connected to the second tensioning structure, and in turn connected to the second movable support through the second tensioning structure. Any appropriate tensioning structure may be used for maintaining the second movable support spaced apart from the second inner side surface when the foldable display panel is in the folded configuration. Examples of the tensioning structure include, but are not limited to, one or more springs.

In some embodiments, the display apparatus includes a first tensioning structure connecting the first housing portion with the first movable support and a second tensioning structure connecting the second housing portion with the second movable support. The first tensioning structure is configured to maintain the first movable support spaced apart from the first inner side surface when the foldable display panel is in the folded configuration and the second tensioning structure is configured to maintain the second movable support spaced apart from the second inner side surface when the foldable display panel is in the folded configuration.

Optionally, the second tensioning structure is in a stretched state when the foldable display panel is in the unfolded configuration, and in a relaxed state when the foldable display panel is in the folded configuration. Optionally, the second tensioning structure is in a stretched state when the foldable display panel is in the unfolded configuration, and in a compressed state when the foldable display panel is in the folded configuration.

The display panel may include more than one housing portions, e.g., 3, 4, or 5 housing portions. In some embodiments, each pair of neighboring housing portions are hinged with respect to each other and are rotatable with respect to each other between a first configuration for holding the foldable display panel in an unfolded configuration and a second configuration for holding the foldable display panel in a folded configuration.

Optionally, the first housing portion has a thickness substantially the same as that of the second housing portion. Optionally, the first movable support has a thickness substantially the same as that of the second movable support. Optionally, the first nonbendable flat portion and the second nonbendable flat portion facing each other in the folded configuration; the first nonbendable flat portion, the bendable portion, and the second nonbendable flat portion are substantially coplanar in the unfolded configuration.

Figure 2A:
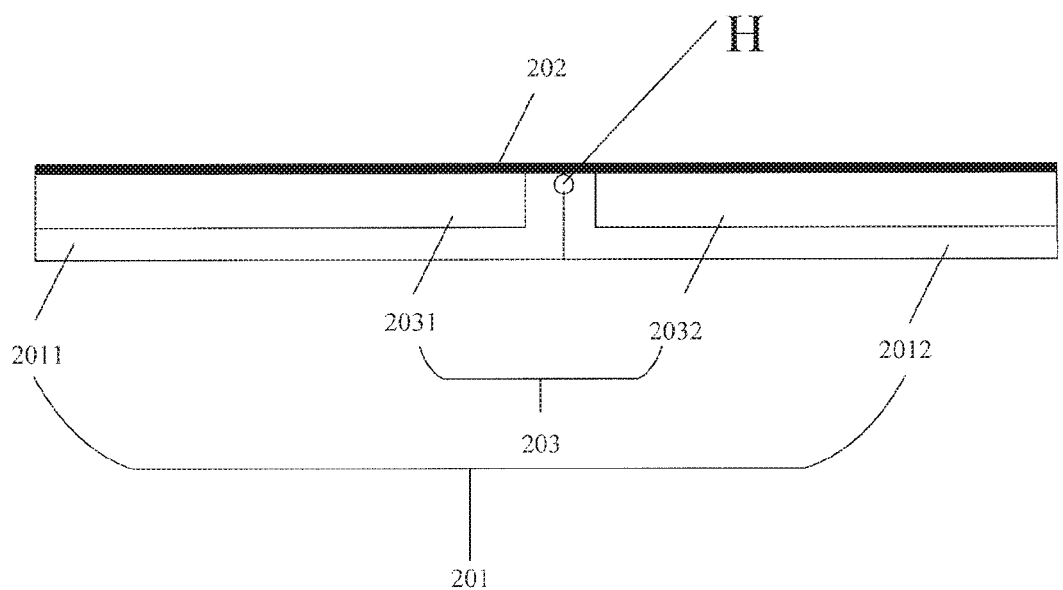
FIGS. 2A-2C are diagrams illustrating the structures of several display apparatuses in some embodiments.
Figure 2B:
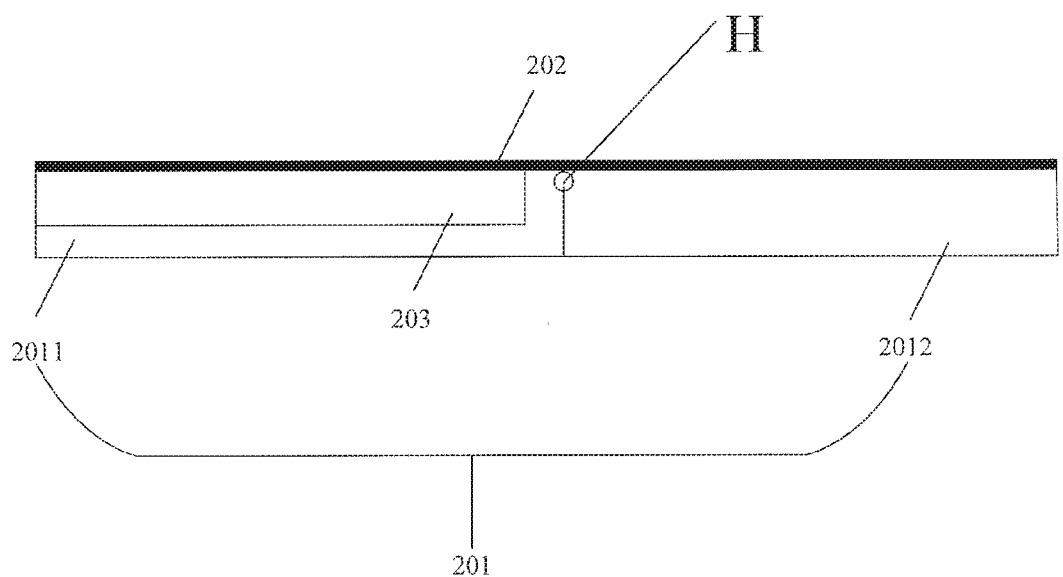
Figure 2C:
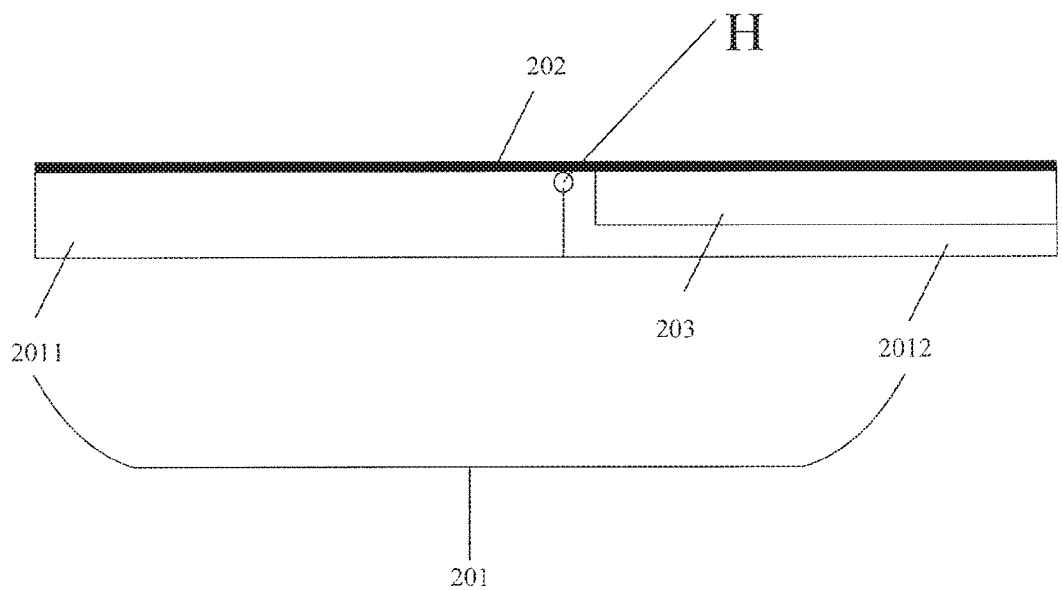

FIGS. 2A-C are diagrams illustrating the structures of several display apparatuses in some embodiments. Referring to FIGS. 2A-2C, the display apparatuses in the embodiments include a housing 201, a foldable display panel 202, and a movable support 203. As shown in FIGS. 2A-C, the display apparatuses in the embodiments are in an unfolded configuration.

The housing 201 provides a frame and support for the entire display apparatus, protecting the display apparatus from external damages. The housing 201 may be made by, e.g., a metal material, an alloy material, a polymer material, etc. The housing 201 in FIGS. 2A-2C includes a first housing portion 2011 and a second housing portion 2012. The first housing portion 2011 and the second housing portion 2012 are hinged together by a hinge H.

The movable support 203 is received in the housing 201. The movable support 203 is movable with respect to the housing 201. For example, the display apparatus in FIG. 2A includes a first movable support 2031 received in the first housing portion 2011 and a second movable support 2032 received in the second housing portion 2012. The display apparatus in FIG. 2B includes a single movable support 203 received in the first housing portion 2011. The display apparatus in FIG. 2C includes a single movable support 203 received in the second housing portion 2012.

In some embodiments, the number of movable support 203 in the first housing portion 2011 is the same as that in the second housing portion 2012. For example, the first housing portion 2011 may receive two first movable supports 2031 and the second housing portion 2012 may receive two second movable supports 2032. In some embodiments, the number of movable support 203 in the first housing portion 2011 is different from that in the second housing portion 2012. For example, the first housing portion 2011 may receive two first movable supports 2031 and the second housing portion 2012 may receive one second movable support 2032.

Referring to FIG. 2A, the display apparatus in the embodiment includes a first housing portion 2011 having a first movable support 2031 and a second housing portion 2012 having a second movable support 2032. The first movable support 2031 is received in the first housing portion 2011, and is movable with respect to the first housing portion 2011. The second movable support 2032 is received in the second housing portion 2012, and is movable with respect to the second housing portion 2012.

Referring to FIG. 2B, the display apparatus in the embodiment includes a first housing portion 2011, a second housing portion 2012, and only one movable support 203 received in the first housing portion 2011. The movable support 203 is movable with respect to the first housing portion 2011.

Referring to FIG. 2C, the display apparatus in the embodiment includes a first housing portion 2011, a second housing portion 2012, and only one movable support 203 within the second housing portion 2012. The movable support 203 is movable with respect to the first housing portion 2012.

The first housing portion 2011 and the second housing portion 2012 are coupled together by a hinge H and rotatable with respect to each other between a first configuration corresponding to the foldable display panel in an unfolded configuration and a second configuration corresponding to the foldable display panel in a folded configuration. In the folded configuration, the foldable display panel 202 is folded in the middle such that the first housing portion 2011 and the second housing portion 2012 are facing each other. In the folded configuration, a cavity is formed between the housing 201 and the movable support 203 for receiving a folded portion of the foldable display panel. In the unfolded configuration, the entire foldable display panel 202 is substantially planar, the movable support 203 moves relative to the housing 201, and occupies the cavity space.

In the present display apparatus, each movable support 203 is received in the housing 201 and movable between two positions relative to the housing 201 (e.g., the first housing portion 2011 or the second housing portion 2012). When the foldable display panel is in the unfolded configuration, the movable support 203 occupies the cavity space, and provides support for the bendable portion of the foldable display panel. Because the bendable portion is sufficiently supported in the unfolded configuration, it is protected from damages resulting from the touch control operation around the bendable portion.

In some embodiments, the display apparatus is a display apparatus as shown in FIG. 2A. Referring to FIG. 2A, the display apparatus in the embodiment includes a housing 201 having a first housing portion 2011 and a second housing portion 2012, a foldable display panel 202, and a movable support 203 including a first movable support 2031 and a second movable support 2032. The first movable support 2031 is received in the first housing portion 2011, the second movable support 2032 is received in the second housing portion 2012.

Figure 3:
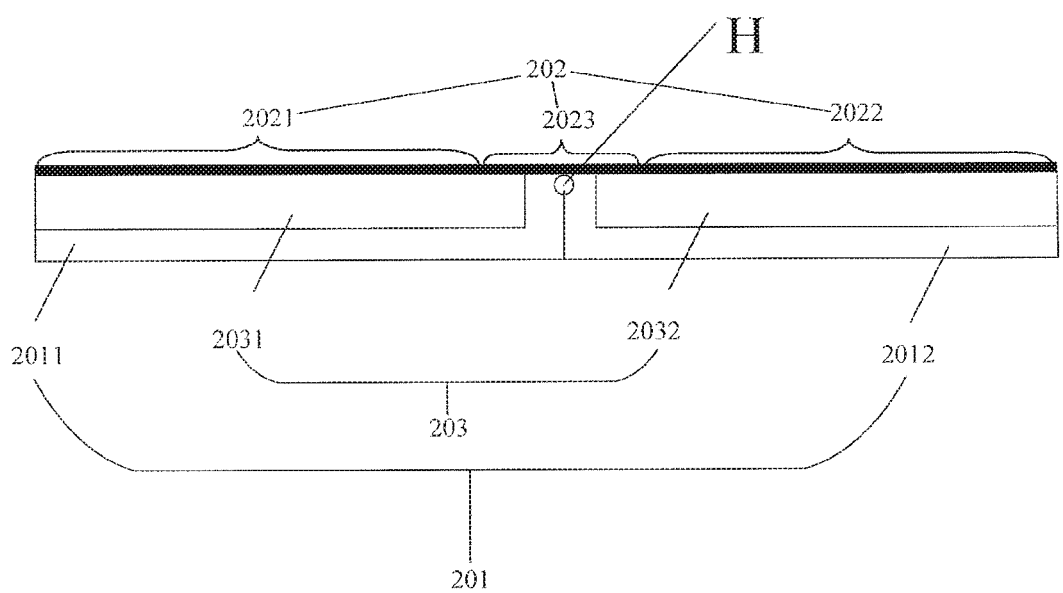
FIG. 3 is a diagram illustrating the structure of a display apparatus in some embodiments.

FIG. 3 is a diagram illustrating the structure of a display apparatus in some embodiments. Referring to FIG. 3, the foldable display panel 202 in the embodiment includes a bendable portion 2023, a first nonbendable flat portion 2021 and a second nonbendable flat portion 2022 on two opposite sides of the bendable portion 2023. The bendable portion 2023 is the folded portion of the foldable display panel in the folded configuration, the bendable portion 2023 connects the first portion 2021 and the second portion 2022. The display apparatus as shown in FIG. 3 is in an unfolded configuration.

In some embodiments, the first nonbendable flat portion 2021 is mounted on the first movable support 2031, and the second nonbendable flat portion 2022 is mounted on the second movable support 2032. The first nonbendable flat portion 2021 is movable together with the first movable support 2031 with respect to the first housing portion 2011. The second nonbendable flat portion 2022 is movable together with the second movable support 2032 with respect to the second housing portion 2012.

Figure 4:
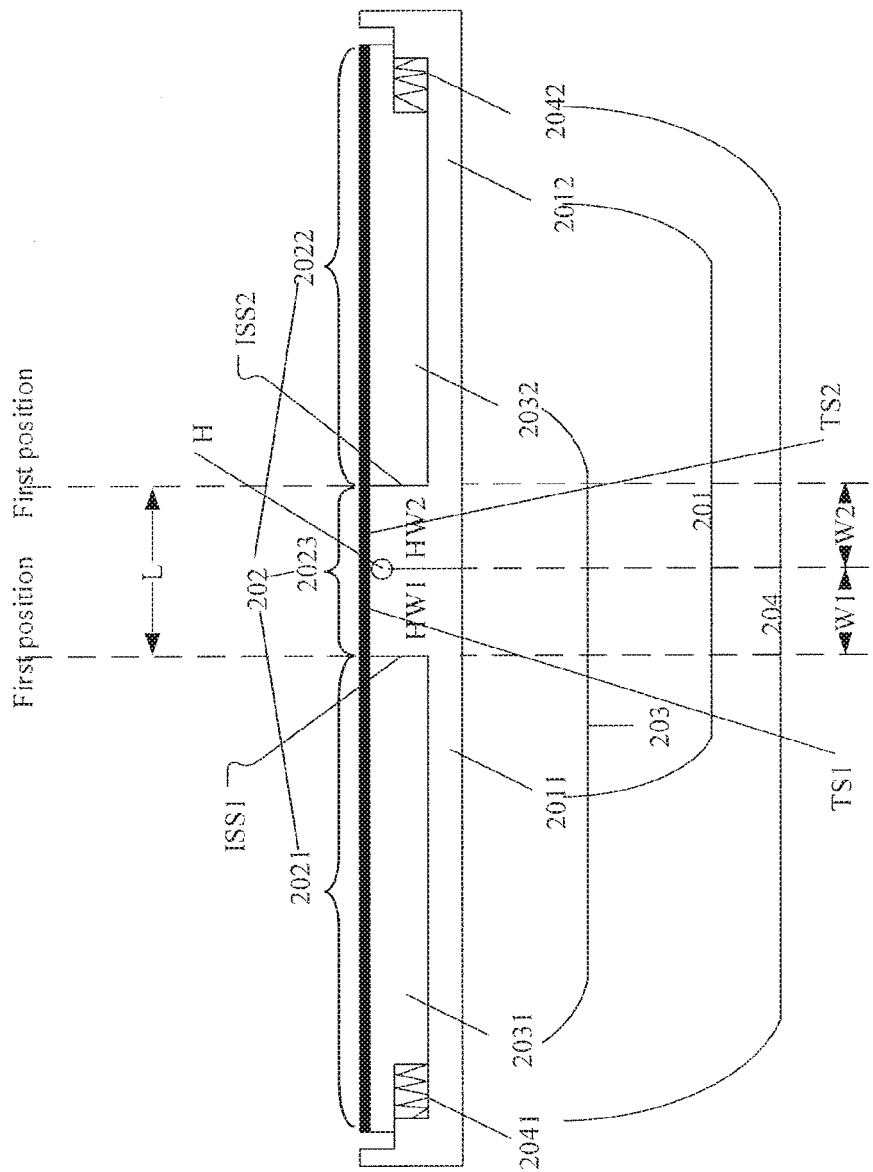
FIG. 4 is a diagram illustrating the structure of a display apparatus in some embodiments.
Figure 5:
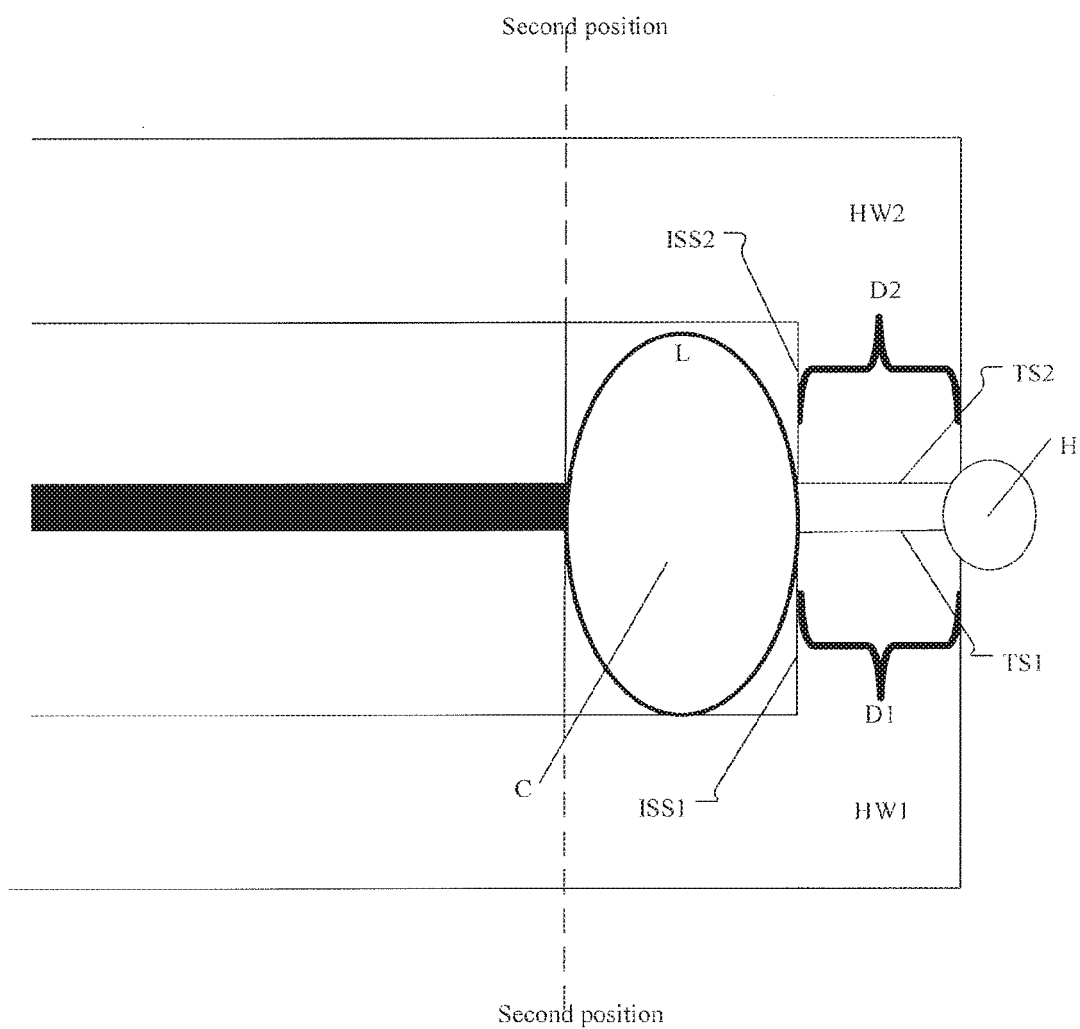
FIG. 5 is a diagram illustrating the structure of a display apparatus in some embodiments.
Figure 6:
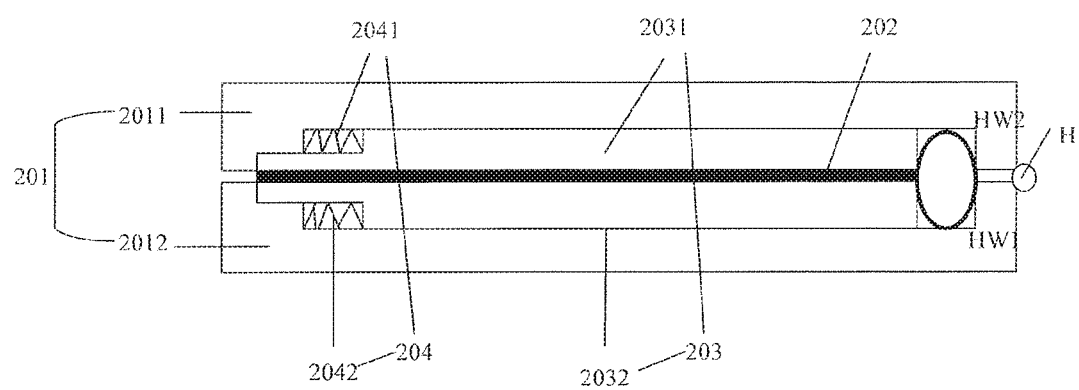
FIG. 6 is a diagram illustrating a closed state of a display apparatus in some embodiments.

FIG. 4 is a diagram illustrating the structure of a display apparatus in some embodiments. FIG. 5 is a diagram illustrating the structure of a display apparatus in some embodiments. The display apparatus as shown in FIG. 4 is in an unfolded configuration. The display apparatus as shown in FIG. 5 is in a folded configuration. Referring to FIG. 4, the foldable display panel 202 further includes a tensioning structure 204 (e.g., a spring). The tensioning structure 204 includes a first tensioning structure 2041 and a second tensioning structure 2042. The first tensioning structure 2041 is disposed between the first movable support 2031 and the first housing portion 2011. One end of the first tensioning structure 2041 is connected to a side of the first housing portion 2011 distal to the hinge. The other end of the first tensioning structure 2041 is connected to a side of the first movable support 2031 distal to the hinge. The second tensioning structure 2042 is disposed between the second movable support 2032 and the second housing portion 2012. One end of the second tensioning structure 2042 is connected to a side of the second housing portion 2012 distal to the hinge. The other end of the second tensioning structure 2042 is connected to a side of the second movable support 2032 distal to the hinge.

As shown in FIGS. 4 and 5, the foldable display panel 202 comprising a bendable portion 2023, a first nonbendable flat portion 2021 and a second nonbendable flat portion 2022 on two opposite sides of the bendable portion 2023. The first housing portion 2011 and a second housing portion 2012 are coupled together by a hinge H and are rotatable with respect to each other between a first configuration corresponding to the foldable display panel in an unfolded configuration and a second configuration corresponding to the foldable display panel in a folded configuration. The first movable support 2031 is received in the first housing portion 2011 for supporting the first nonbendable flat portion 2021 and is configured to be movable between a first position corresponding to the unfolded configuration and a second position corresponding to the folded configuration. The second movable support 2032 is received in the second housing portion 2012 for supporting the second nonbendable flat portion 2022 and is configured to be movable between a third position corresponding to the unfolded configuration and a fourth position corresponding to the folded configuration. When the foldable display panel is in the unfolded configuration, the first movable support 2031 at the first position substantially abuts a first inner side surface ISS1 of the first housing portion 2011 and the second movable support 2032 at the third position substantially abuts a second inner side surface ISS2 of the second housing portion 2012, so that substantially an entire surface of the bendable portion is supported by at least the first housing portion 2011 and the second housing portion 2012. When the foldable display panel is in the folded configuration, the first movable support 2031 at the second position is spaced apart from the first inner side surface ISS1 and the second movable support 2032 at the fourth position is spaced apart from the second inner side surface, for receiving the bendable portion 2023 in a space between the first movable support 2031, the second movable support 2032, the first inner side surface ISS1, and the second inner side surface ISS2 (see FIG. 5).

Referring to FIGS. 4 and 5, the first housing portion 2011 and the second housing portion 2012 are coupled together at a first housing wall HW1 of the first housing portion 2011 and a second housing wall HW2 of the second housing portion 2012. The first housing wall HW1 has a first top surface TS1 connected to the first inner side surface ISS1. The second housing wall HW2 has a second top surface TS2 connected to the second inner side surface ISS2. When the foldable display panel 202 is in the unfolded configuration, substantially the entire surface of the bendable portion 2023 is supported by at least the first top surface TS1 and the second top surface TS2.

In FIG. 5, the foldable display panel 202 is switched from the unfolded configuration to the folded configuration, the first movable support 2031 and the second movable support 2032 are pulled by the first tensioning structure 2041 and the second tensioning structure 2042, and move along a direction away from the hinge it. The first movable support 2031, the first housing portion 2011, the second movable support 2032, and the second housing portion 2012 together form a cavity C. In FIG. 4, the foldable display panel 202 is switched from the folded configuration to the unfolded configuration, the first movable support 2031 and the second movable support 2032 are pulled by the foldable display panel 202, move along a direction towards the cavity, and occupy the cavity space.

Referring to FIG. 4, the bendable portion 2023 has a length L along a direction from the first nonbendable flat portion to the second nonbendable flat portion in the unfolded configuration. The first top surface TS1 has a first width W1 along a direction from the first inner surface ISS1 to the hinge H. The second top surface TS2 has a second width W2 along a direction from the second inner surface ISS2 to the hinge H. L is substantially the same a sum of W1+W2.

Referring to FIG. 5, the bendable portion 2023 has a length L along a direction from the first nonbendable flat portion 2021 to the second nonbendable flat portion 2022 in the unfolded configuration. A first normal distance between the hinge H and a first interface between the first top surface TS1 and the first inner side surface ISS1 is D1. A second normal distance D2 between the hinge H and a second interface between the second top surface TS2 and the second inner side surface ISS2 is D2. L is substantially the same as a sum of D1 and D2.

In some embodiments, the first housing portion 2011 and the second housing portion 2012 have substantially the same thickness. This design ensures that the foldable display panel 202 is closely mounted to the surface of the housing 201 and the movable support 203, either in the open state or in the closed state.

In some embodiment, the first nonbendable flat portion 2021, the second nonbendable flat portion 2022, and the bendable portion 2023 are substantially planar when the foldable display panel 202 is in the unfolded configuration (see, e.g., FIG. 4). When the foldable display panel 202 is in the folded configuration, the first nonbendable flat portion 2021 and the second nonbendable flat portion 2022 are facing each other, and the bendable portion 2023 is received in the cavity C formed by the first movable support 2031, the first housing portion 2011, the second movable support 2032, and the second housing portion 2012 (see, e.g., FIG. 5). Optionally, the cavity C is so dimensioned that the bendable portion 2023 has the maximum radius when received within the cavity, preventing mechanical damages to the bendable portion 2023 (see, e.g., FIG. 6). In the folded configuration, the size of the display apparatus is half of that in the unfolded configuration, making it more portable.

In the present display apparatus, each movable support 203 is received in the housing 201 and movable between two positions relative to the housing 201 (e.g., the first housing portion 2011 or the second housing portion 2012). When the foldable display panel is in the unfolded configuration, the movable support 203 occupies the cavity space, and provides support for the bendable portion of the foldable display panel. Because the bendable portion is sufficiently supported in the unfolded configuration, it is protected from damages resulting from the touch control operation around the bendable portion.

In some embodiments, the display apparatus is a display apparatus as shown in FIG. 2B. Referring to FIG. 2B, the display apparatus in the embodiment includes a housing 201 having a first housing portion 2011 and a second housing portion 2012, a foldable display panel 202, and a single movable support 203. The display apparatus requires only one tensioning structure in the first housing portion 2011 for connecting the movable support 203 and the first housing portion 2011.

Figure 7:
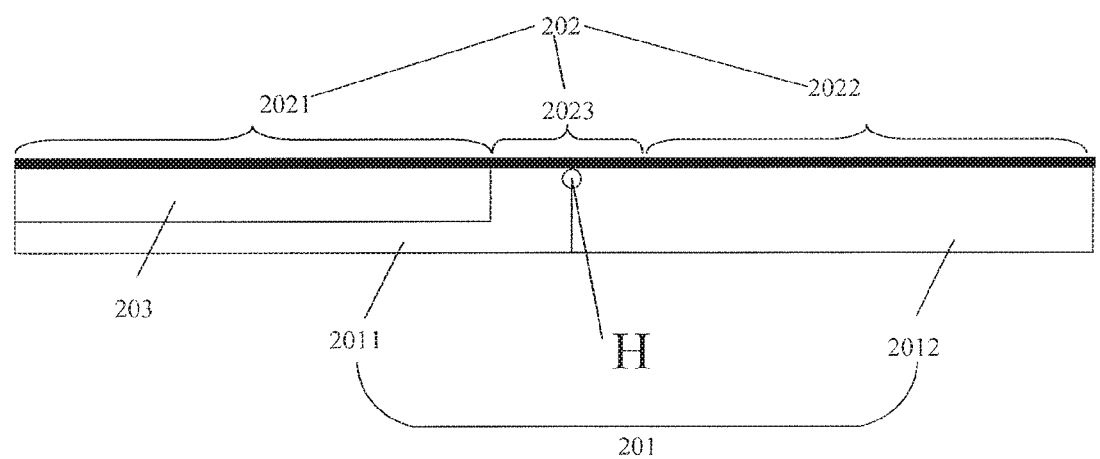
FIG. 7 is a diagram illustrating the structure of a display apparatus in some embodiments.

FIG. 7 is a diagram illustrating the structure of a display apparatus in some embodiments. Referring to FIG. 7, the foldable display panel 202 in the embodiment includes a bendable portion 2023, a first nonbendable flat portion 2021 and a second nonbendable flat portion 2022 on two opposite sides of the bendable portion 2023. The bendable portion 2023 is the folded portion of the foldable display panel in the folded configuration. The bendable portion 2023 connects the first nonbendable flat portion 2021 and the second nonbendable flat portion 2022. The display apparatus in FIG. 7 is in an unfolded configuration.

In some embodiments, the first nonbendable flat portion 2021 is mounted on the movable support 203, and the second nonbendable flat portion 2022 is mounted on the second housing portion 2012. The first nonbendable flat portion 2021 is movable together with the movable support 203 with respect to the first housing portion 2011.

Figure 8:
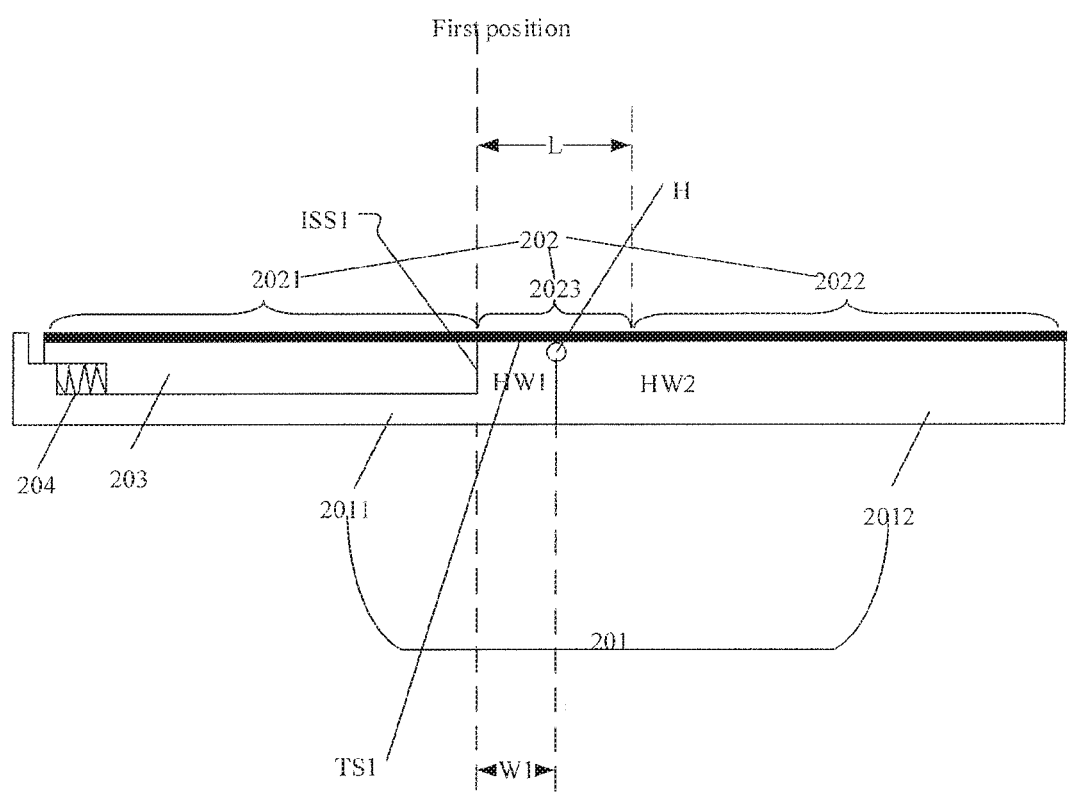
FIG. 8 is a diagram illustrating the structure of a display apparatus in some embodiments.
Figure 9:
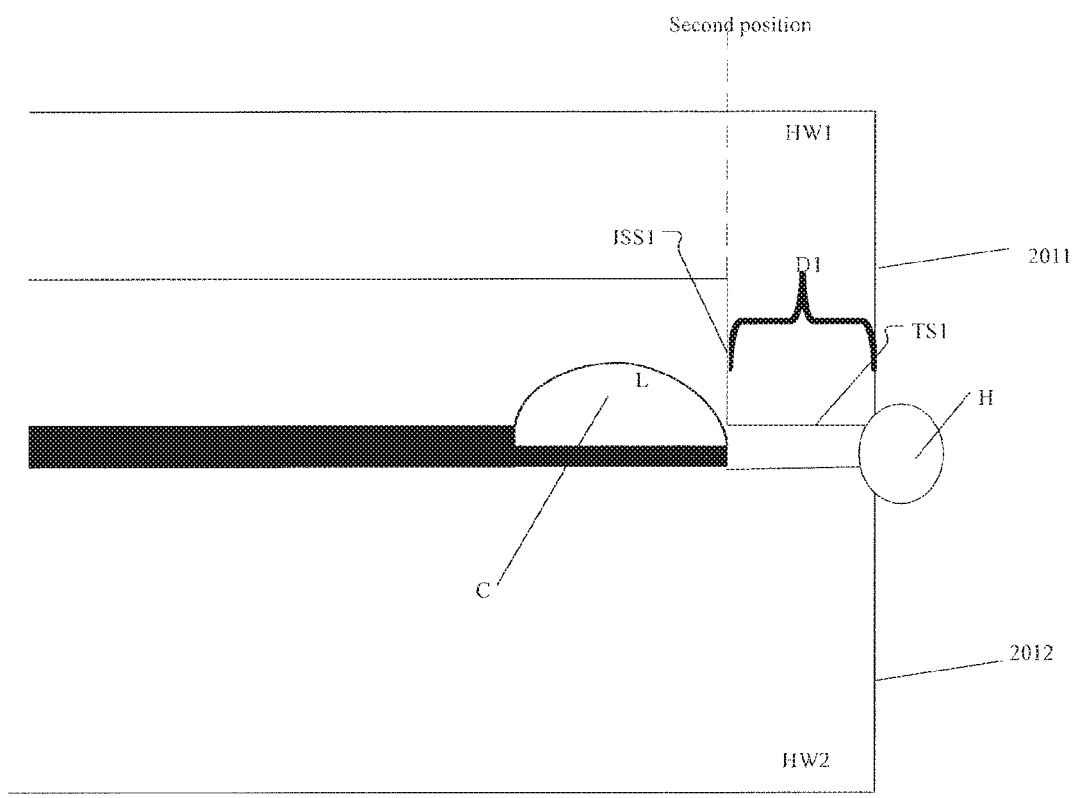
FIG. 9 is a diagram illustrating the structure of a display apparatus in some embodiments.
Figure 10:
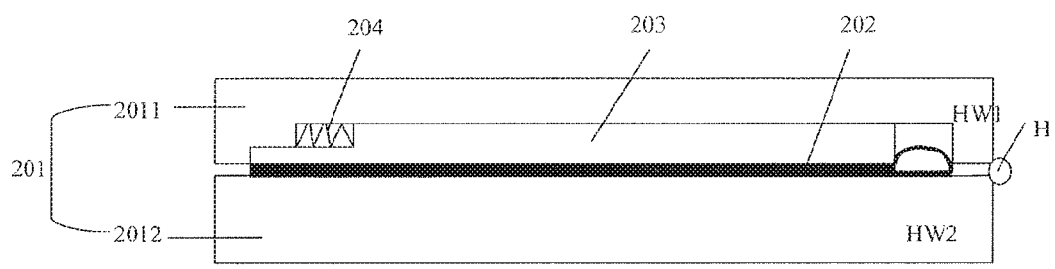
FIG. 10 is a diagram illustrating a closed state of a display apparatus in some embodiments.

FIG. 8 is a diagram illustrating the structure of a display apparatus in some embodiments. FIG. 9 is a diagram illustrating the structure of a display apparatus in some embodiments. The display apparatus as shown in FIG. 8 is in an unfolded configuration. The display apparatus as shown in FIG. 9 is in a folded configuration. Referring to FIG. 8, the foldable display panel 202 further includes a tensioning structure 204 (e.g., a spring). The tensioning structure 204 is disposed between the movable support 203 and the first housing portion 2011. One end of the tensioning structure 204 is connected to a side of the first housing portion 2011 distal to the hinge H. The other end of the tensioning structure 204 is connected to a side of the movable support 203 distal to the hinge H.

As shown in FIGS. 8 and 9, the foldable display panel 202 comprising a bendable portion 2023, a first nonbendable flat portion 2021 and a second nonbendable flat portion 2022 on two opposite sides of the bendable portion 2023. The first housing portion 2011 and a second housing portion 2012 are coupled together by a hinge H and are rotatable with respect to each other between a first configuration corresponding to the foldable display panel in an unfolded configuration and a second configuration corresponding to the foldable display panel in a folded configuration. The single movable support 203 is received in the first housing portion 2011 for supporting the first nonbendable flat portion 2021 and is configured to be movable between a first position corresponding to the unfolded configuration and a second position corresponding to the folded configuration. When the foldable display panel 202 is in the unfolded configuration, the movable support 203 at the first position substantially abuts a first inner side surface ISS1 of the first housing portion 2011, so that substantially an entire surface of the bendable portion is supported by at least the first housing portion 2011 and the second housing portion 2012. When the foldable display panel 202 is in the folded configuration, the movable support 203 at the second position is spaced apart from the first inner side surface ISS1 for receiving the bendable portion 2023 in a space between the movable support 203 and the first inner side surface ISS1 (see FIG. 9).

Referring to FIGS. 8 and 9, the first housing portion 2011 and the second housing portion 2012 are coupled together at a first housing wall HW1 of the first housing portion 2011 and a second housing wall HW2 of the second housing portion 2012. The first housing wall HW1 has a first top surface TS1 connected to the first inner side surface ISS1.

When the foldable display panel 202 is in the unfolded configuration, substantially the entire surface of the bendable portion 2023 is supported by at least the first top surface TS1 and the second housing portion 2012.

In FIG. 9, the foldable display panel 202 is switched from the unfolded configuration to the folded configuration, the movable support 203 is pulled by the single tensioning structure 204, and moves along a direction away from the hinge H. The movable support 203, the first housing portion 2011, and the second housing portion 2012 together form a cavity C. In FIG. 8, the foldable display panel 202 is switched from the folded configuration to the unfolded configuration, the movable support 203 is pulled by the foldable display panel 202, moves along a direction towards the cavity, and occupy the cavity space.

Referring to FIG. 8, the bendable portion 2023 has a length L along a direction from the first nonbendable flat portion to the second nonbendable flat portion in the unfolded configuration. The first top surface TS1 has a first width W1 along a direction from the first inner surface ISS1 to the hinge H. L is substantially twice that of W1.

Referring to FIG. 9, the bendable portion 2023 has a length L along a direction from the first nonbendable flat portion 2021 to the second nonbendable flat portion 2022 in the unfolded configuration. A first normal distance between the hinge H and a first interface between the first top surface TS1 and the first inner side surface ISS1 is D1. L is substantially twice that of D1.

In some embodiments, the first housing portion 2011 and the second housing portion 2012 have substantially the same thickness. This design ensures that the foldable display panel 202 is closely mounted to the surface of the housing 201 and the movable support 203, either in the open state or in the closed state.

In some embodiment, the first nonbendable flat portion 2021, the second nonbendable flat portion 2022, and the bendable portion 2023 are substantially planar when the foldable display panel 202 is in the unfolded configuration (see. e.g., FIG. 8). When the foldable display panel 202 is in the folded configuration, the first nonbendable flat portion 2021 and the second nonbendable flat portion 2022 are facing each other, and the bendable portion 2023 is received in the cavity C formed by the movable support 203, the first housing portion 2011, and the second housing portion 2012 (see, e.g., FIG. 9). Optionally, the cavity C is so dimensioned that the bendable portion 2023 has the maximum radius when received within the cavity, preventing mechanical damages to the bendable portion 2023 (see, e.g., FIG. 10). In the folded configuration, the size of the display apparatus is half of that in the unfolded configuration, making it more portable.

In the present display apparatus, each movable support 203 is received in the housing 201 and movable between two positions relative to the housing 201 (e.g., the first housing portion 2011 or the second housing portion 2012). When the foldable display panel is in the unfolded configuration, the movable support 203 occupies the cavity space, and provides support for the bendable portion of the foldable display panel. Because the bendable portion is sufficiently supported in the unfolded configuration, it is protected from damages resulting from the touch control operation around the bendable portion.

In some embodiments, the display apparatus is a display apparatus as shown in FIG. 2C. Referring to FIG. 2C, the display apparatus in the embodiment includes a housing 201 having a first housing portion 2011 and a second housing portion 2012, a foldable display panel 202, and a single movable support 203. The display apparatus requires only one tensioning structure in the second housing portion 2012 for connecting the movable support 203 and the second housing portion 2012.

Figure 11:
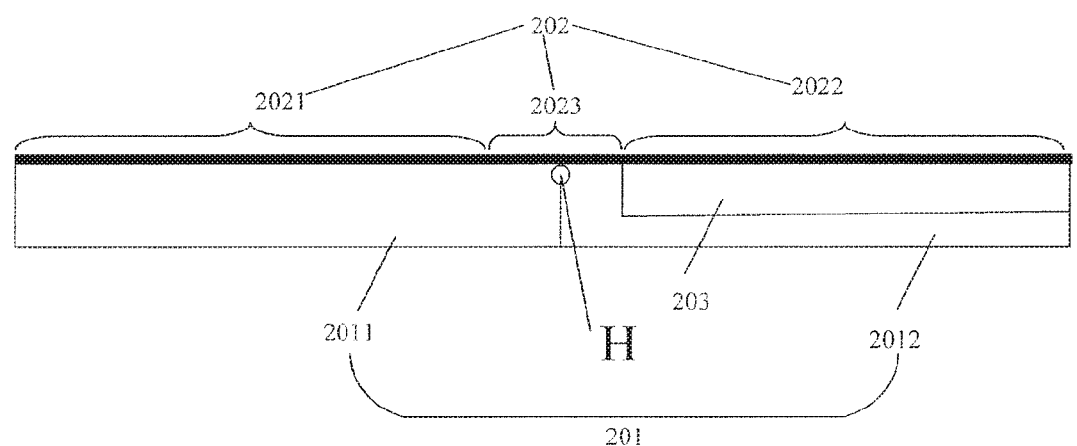
FIG. 11 is a diagram illustrating the structure of a display apparatus in some embodiments.

FIG. 11 is a diagram illustrating the structure of a display apparatus in some embodiments. Referring to FIG. 11, the foldable display panel 202 in the embodiment includes a bendable portion 2023, a first nonbendable flat portion 2021 and a second nonbendable flat portion 2022 on two opposite sides of the bendable portion 2023. The bendable portion 2023 is the folded portion of the foldable display panel in the folded configuration. The bendable portion 2023 connects the first nonbendable flat portion 2021 and the second nonbendable flat portion 2022. The display apparatus in FIG. 11 is in an unfolded configuration.

In some embodiments, the first nonbendable flat portion 2021 is mounted on the first housing portion 2011, and the second nonbendable flat portion 2022 is mounted on the movable support 203. The second nonbendable flat portion 2022 is movable together with the movable support 203 with respect to the second housing portion 2012.

Figure 12:
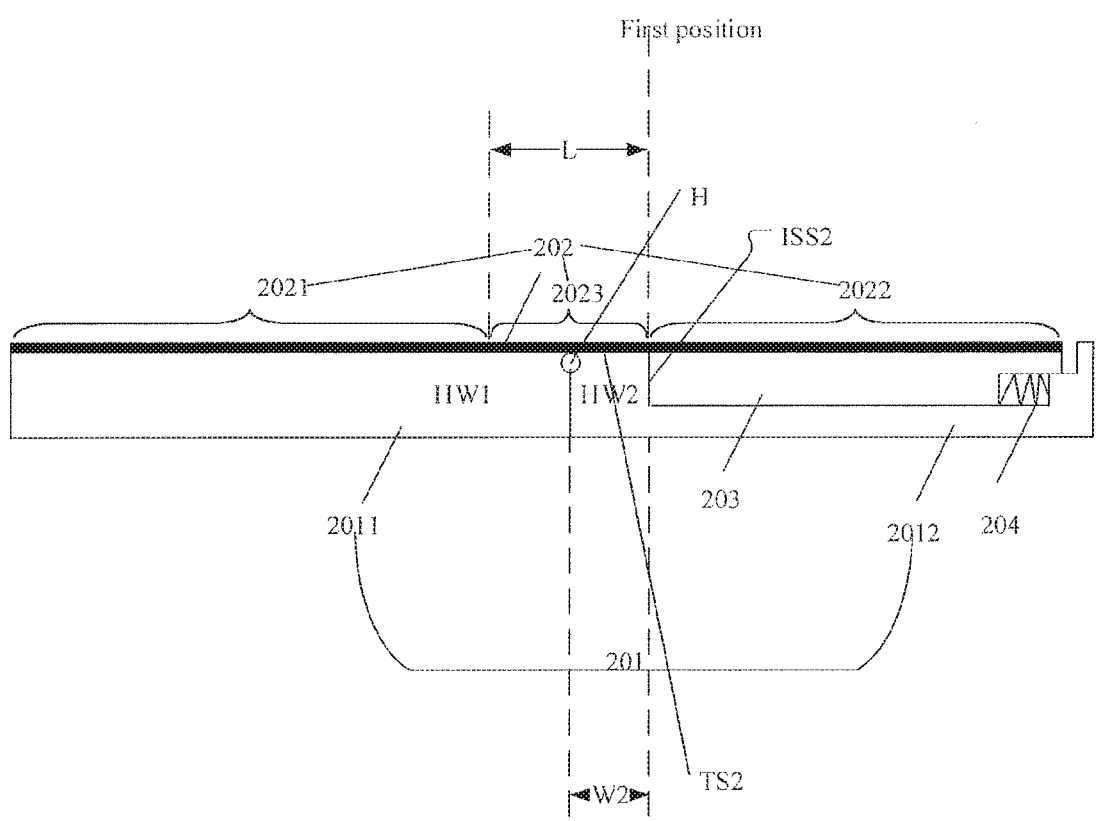
FIG. 12 is a diagram illustrating the structure of a display apparatus in some embodiments.
Figure 13:
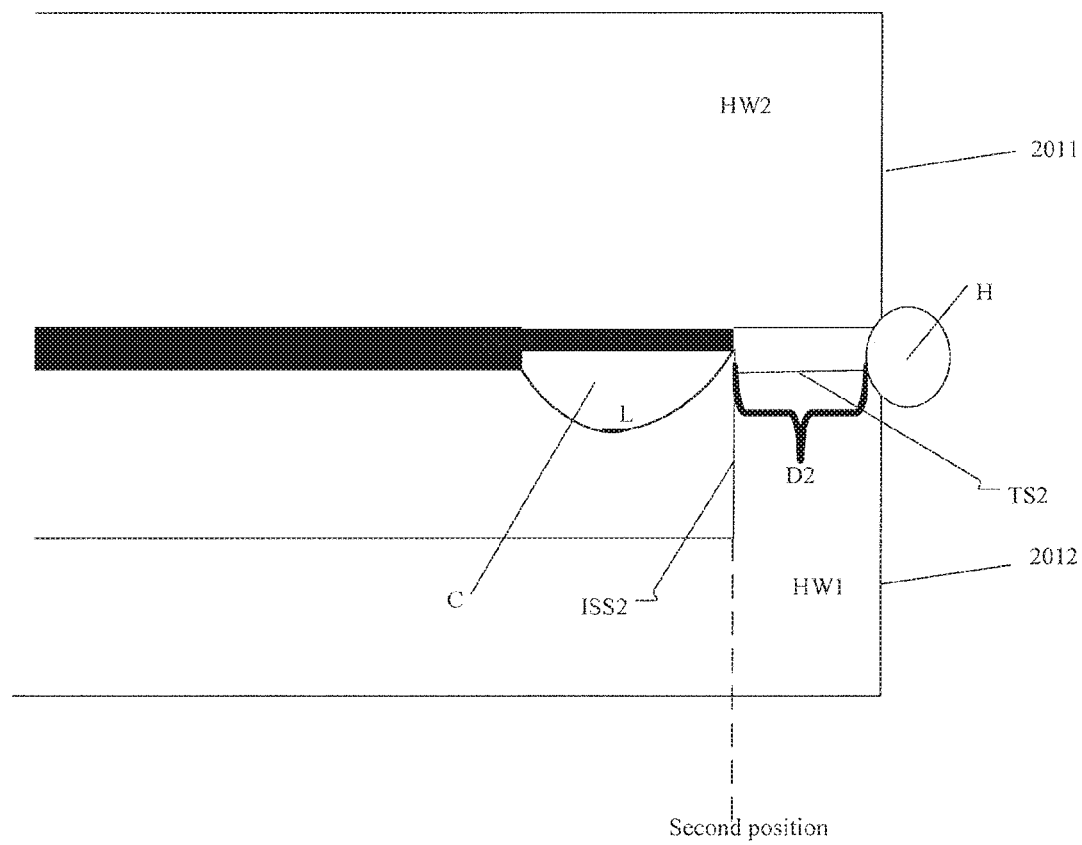
FIG. 13 is a diagram illustrating the structure of a display apparatus in some embodiments.
Figure 14:
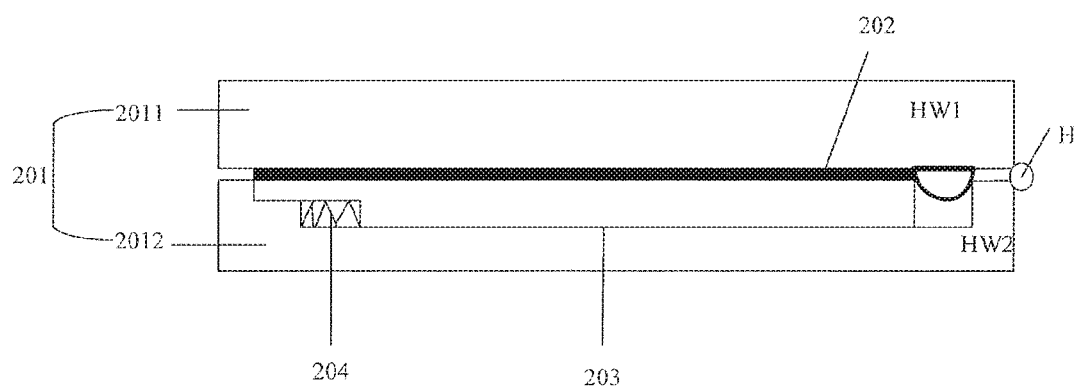
FIG. 14 is a diagram illustrating a closed state of a display apparatus in some embodiments.

FIG. 12 is a diagram illustrating the structure of a display apparatus in some embodiments. FIG. 13 is a diagram illustrating the structure of a display apparatus in some embodiments. The display apparatus as shown in FIG. 12 is in an unfolded configuration. The display apparatus as shown in FIG. 13 is in a folded configuration. Referring to FIG. 12, the foldable display panel 202 further includes a tensioning structure 204 (e.g., a spring). The tensioning structure 204 is disposed between the movable support 203 and the second housing portion 2012. One end of the tensioning structure 204 is connected to a side of the second housing portion 2012 distal to the hinge H. The other end of the tensioning structure 204 is connected to a side of the movable support 203 distal to the hinge H.

As shown in FIGS. 12 and 13, the foldable display panel 202 comprising a bendable portion 2023, a first nonbendable flat portion 2021 and a second nonbendable flat portion 2022 on two opposite sides of the bendable portion 2023. The first housing portion 2011 and a second housing portion 2012 are coupled together by a hinge H and are rotatable with respect to each other between a first configuration corresponding to the foldable display panel in an unfolded configuration and a second configuration corresponding to the foldable display panel in a folded configuration. The single movable support 203 is received in the second housing portion 2012 for supporting the second nonbendable flat portion 2021 and is configured to be movable between a third position corresponding to the unfolded configuration and a fourth position corresponding to the folded configuration. When the foldable display panel 202 is in the unfolded configuration, the movable support 203 at the third position substantially abuts a second inner side surface ISS2 of the second housing portion 2012, so that substantially an entire surface of the bendable portion is supported by at least the first housing portion 2011 and the second housing portion 2012. When the foldable display panel 202 is in the folded configuration, the movable support 203 at the fourth position is spaced apart from the second inner side surface ISS2 for receiving the bendable portion 2023 in a space between the movable support 203 and the second inner side surface ISS2 (see FIG. 13).

Referring to FIGS. 12 and 13, the first housing portion 2011 and the second housing portion 2012 are coupled together at a first housing wall HW1 of the first housing portion 2011 and a second housing wall HW2 of the second housing portion 2012. The second housing wall HW1 has a second top surface TS2 connected to the second inner side surface ISS2. When the foldable display panel 202 is in the unfolded configuration, substantially the entire surface of the bendable portion 2023 is supported by at least the first housing portion 2011 and the second top surface TS2.

In FIG. 13, the foldable display panel 202 is switched from the unfolded configuration to the folded configuration, the movable support 203 is pulled by the single tensioning structure 204, and moves along a direction away from the hinge H. The movable support 203, the first housing portion 2011, and the second housing portion 2012 together form a cavity C. In FIG. 12, the foldable display panel 202 is switched from the folded configuration to the unfolded configuration, the movable support 203 is pulled by the foldable display panel 202, moves along a direction towards the cavity, and occupy the cavity space.

Referring to FIG. 12, the bendable portion 2023 has a length L along a direction from the first nonbendable flat portion to the second nonbendable flat portion in the unfolded configuration. The second top surface TS2 has a second width W2 along a direction from the second inner surface ISS2 to the hinge H. L is substantially twice that of W2.

Referring to FIG. 13, the bendable portion 2023 has a length L along a direction from the first nonbendable flat portion 2021 to the second nonbendable flat portion 2022 in the unfolded configuration. A second normal distance between the hinge H and a second interface between the second top surface TS2 and the second inner side surface ISS2 is D2. L is substantially twice that of D2.

In some embodiments, the first housing portion 2011 and the second housing portion 2012 have substantially the same thickness. This design ensures that the foldable display panel 202 is closely mounted to the surface of the housing 201 and the movable support 203, either in the open state or in the closed state.

In some embodiment, the first nonbendable flat portion 2021, the second nonbendable flat portion 2022, and the bendable portion 2023 are substantially planar when the foldable display panel 202 is in the unfolded configuration (see, e.g., FIG. 12). When the foldable display panel 202 is in the folded configuration, the first nonbendable flat portion 2021 and the second nonbendable flat portion 2022 are facing each other, and the bendable portion 2023 is received in the cavity C formed by the movable support 203, the first housing portion 2011, and the second housing portion 2012 (see, e.g., FIG. 13). Optionally, the cavity C is so dimensioned that the bendable portion 2023 has the maximum radius when received within the cavity, preventing mechanical damages to the bendable portion 2023 (see, e.g., FIG. 14). In the folded configuration, the size of the display apparatus is half of that in the unfolded configuration, making it more portable.

In the present display apparatus, each movable support 203 is received in the housing 201 and movable between two positions relative to the housing 201 (e.g., the first housing portion 2011 or the second housing portion 2012). When the foldable display panel is in the unfolded configuration, the movable support 203 occupies the cavity space, and provides support for the bendable portion of the foldable display panel. Because the bendable portion is sufficiently supported in the unfolded configuration, it is protected from damages resulting from the touch control operation around the bendable portion.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
    a foldable display panel comprising a bendable portion, a first nonbendable flat portion and a second nonbendable flat portion on two opposite sides of the bendable portion;
    a first housing portion and a second housing portion coupled together by a hinge and rotatable with respect to each other between a first configuration corresponding to the foldable display panel in an unfolded configuration and a second configuration corresponding to the foldable display panel in a folded configuration; and
    a first movable support received in the first housing portion for supporting the first nonbendable flat portion and configured to be movable between a first position corresponding to the unfolded configuration and a second position corresponding to the folded configuration;
    wherein the first movable support at the first position supports a part of the bendable portion of the foldable display panel; and the first movable support at the second position provides a space for receiving the bendable portion bent therein; and
    an entire surface of the bendable portion at the first position corresponding to the unfolded configuration is substantially supported.

2. The display apparatus of claim 1, wherein the first movable support at the first position substantially abuts a first inner side surface of the first housing portion so that substantially the entire surface of the bendable portion is supported by at least the first housing portion and the second housing portion; the first movable support at the second position is spaced apart from the first inner side surface for receiving the bendable portion in a space between the first movable support and the first inner side surface.

3. The display apparatus of claim 2, wherein the first housing portion and the second housing portion are coupled together at a first housing wall of the first housing portion and a second housing wall of the second housing portion; the first housing wall has a first top surface connected to the first inner side surface; and in the unfolded configuration substantially the entire surface of the bendable portion is supported by at least the first top surface and the second housing portion.

4. The display apparatus of claim 3, wherein the bendable portion has a length L along a direction from the first nonbendable flat portion to the second nonbendable flat portion in the unfolded configuration, the first top surface has a first width W1 along a direction from the first inner surface to the hinge, and L is substantially twice that of W1.

5. The display apparatus of claim 3, wherein the bendable portion has a length L along a direction from the first nonbendable flat portion to the second nonbendable flat portion in the unfolded configuration, L is substantially twice that of a first normal distance D1 between the hinge and a first interface between the first top surface and the first inner side surface.

6. The display apparatus of claim 1, wherein the first nonbendable flat portion is mounted on the first movable support, and is movable together with the first movable support with respect to the first housing portion.

7. The display apparatus of claim 6, wherein the second nonbendable flat portion is mounted on the second housing portion.

8. The display apparatus of claim 1, further comprising a first tensioning structure connecting the first housing portion with the first movable support, the first tensioning structure configured to maintain the first movable support spaced apart from the first inner side surface in the folded configuration.

9. The display apparatus of claim 8, wherein the first tensioning structure is in a stretched state when the foldable display panel is in the unfolded configuration, and in a relaxed state when the foldable display panel is in the folded configuration.

10. The display apparatus of claim 1, further comprising a second movable support received in the second housing portion for supporting the second nonbendable flat portion and configured to be movable between a third position corresponding to the unfolded configuration and a fourth position corresponding to the folded configuration;

when the foldable display panel is in the unfolded configuration the second movable support at the third position substantially abuts a second inner side surface of the second housing portion so that substantially the entire surface of the bendable portion is supported by at least the first housing portion and the second housing portion; in the folded configuration the first movable support at the second position is spaced apart from the first inner side surface and the second movable support at the fourth position is spaced apart from the second inner side surface for receiving the bendable portion in a space between the second movable support and the second inner side surface.

11. The display apparatus of claim 10, wherein the first housing portion and the second housing portion are coupled together at a first housing wall of the first housing portion and a second housing wall of the second housing portion; the first housing wall has a first top surface connected to the first inner side surface; the second housing wall has a second top surface connected to the second inner side surface; and in the unfolded configuration substantially the entire surface of the bendable portion is supported by at least the first top surface and the second top surface.

12. The display apparatus of claim 11, wherein the bendable portion has a length L along a direction from the first nonbendable flat portion to the second nonbendable flat portion in the unfolded configuration, the first top surface has a first width W1 along a direction from the first inner surface to the hinge, the second top surface has a second width W2 along a direction from the second inner surface to the hinge, and L is substantially the same as a sum of W1 and W2.

13. The display apparatus of claim 11, wherein the bendable portion has a length L along a direction from the first nonbendable flat portion to the second nonbendable flat portion in the unfolded configuration, L is substantially the same as a sum of a first normal distance D1 between the hinge and a first interface between the first top surface and the first inner side surface, and a second normal distance D2 between the hinge and a second interface between the second top surface and the second inner side surface.

14. The display apparatus of claim 10, wherein the first nonbendable flat portion is mounted on the first movable support, and is movable together with the first movable support with respect to the first housing portion; the second nonbendable flat portion is mounted on the second movable support, and is movable together with the second movable support with respect to the second housing portion.

15. The display apparatus of claim 10, further comprising a first tensioning structure connecting the first housing portion with the first movable support, the first tensioning structure configured to maintain the first movable support spaced apart from the first inner side surface in the folded configuration; and a second tensioning structure connecting the second housing portion with the second movable support, the second tensioning structure configured to maintain the second movable support spaced apart from the second inner side surface in the folded configuration.

16. The display apparatus of claim 1, wherein, at the first position corresponding to the unfolded configuration, an orthographic projection of the entire surface of the bendable portion on a plane containing a surface of the foldable display panel is substantially outside an orthographic projection of any floating space in the foldable display panel.

17. The display apparatus of claim 1, wherein, at the first position corresponding to the unfolded configuration, the foldable display panel is substantially absent of any floating space abutting the bendable portion and on a side of the bendable portion proximal to the first housing portion and the second housing portion.

18. The display apparatus of claim 1, wherein the entire surface of the bendable portion is in contact with surfaces of the first housing portion and the second housing portion.

19. The display apparatus of claim 1, wherein the entire surface of the bendable portion is in contact with surfaces of the first housing portion, the second housing portion, and the first movable support.

20. The display apparatus of claim 1, wherein the entire surface of the bendable portion is in contact with surfaces of the first housing portion, the second housing portion, the first movable support, and the second movable support.

* * * * *